(12) United States Patent
Nagaoka et al.

(10) Patent No.: US 8,973,431 B2
(45) Date of Patent: Mar. 10, 2015

(54) APPARATUS FOR DIAGNOSING CAUSES OF $NO_x$ CONVERSION EFFICIENCY DEGRADATION

(75) Inventors: Daiji Nagaoka, Fujisawa (JP); Teruo Nakada, Fujisawa (JP)

(73) Assignee: Isuzu Motors Limited, Tokyo (JP)

(*) Notice: Subject to any disclaimer, the term of this patent is extended or adjusted under 35 U.S.C. 154(b) by 12 days.

(21) Appl. No.: 13/994,493

(22) PCT Filed: Dec. 7, 2011

(86) PCT No.: PCT/JP2011/078284
§ 371 (c)(1),
(2), (4) Date: Jun. 14, 2013

(87) PCT Pub. No.: WO2012/081464
PCT Pub. Date: Jun. 21, 2012

(65) Prior Publication Data
US 2013/0306171 A1 Nov. 21, 2013

(30) Foreign Application Priority Data

Dec. 16, 2010 (JP) ................................ 2010-280889

(51) Int. Cl.
*G01M 15/10* (2006.01)
*F01N 11/00* (2006.01)
(Continued)

(52) U.S. Cl.
CPC ............ *F01N 11/00* (2013.01); *B01D 53/9409* (2013.01); *B01D 53/9477* (2013.01); *B01D 53/9495* (2013.01); *F01N 3/0814* (2013.01); *F01N 3/0842* (2013.01); *F01N 3/106* (2013.01); *F01N 3/035* (2013.01); *F01N 13/0097* (2013.01); *Y02T 10/47* (2013.01); *F01N 3/2066* (2013.01); *F01N 2550/02* (2013.01); *F01N 2550/03* (2013.01); *F01N 2610/03* (2013.01); *F01N 2900/1631* (2013.01)
USPC ........................................................ 73/114.69

(58) Field of Classification Search
USPC ........................................................ 73/114.69
See application file for complete search history.

(56) References Cited

U.S. PATENT DOCUMENTS 6,925,796 B2 * 8/2005 Nieuwstadt et al. ............ 60/277
7,418,816 B2 * 9/2008 Upadhyay et al. .............. 60/285
(Continued)

FOREIGN PATENT DOCUMENTS

| JP | 2005-201143 | 7/2005 |
| JP | 2005-351153 | 12/2005 |

(Continued)

OTHER PUBLICATIONS

Written Opinion of the International Searching Authority mailed Feb. 21, 2012 in corresponding International Application No. PCT/JP2011/078284.

(Continued)

*Primary Examiner* — Freddie Kirkland, III
(74) *Attorney, Agent, or Firm* — Staas & Halsey LLP (57) ABSTRACT

An apparatus for on-board diagnoses of causes of $NO_X$ conversion efficiency degradation including: a diagnosis exhaust-pipe fuel injection control unit; a $NO_X$ purification device failure specifying unit; and an oxidizing catalyst device failure specifying unit.

2 Claims, 5 Drawing Sheets

(51) Int. Cl.
*B01D 53/94* (2006.01)
*F01N 3/08* (2006.01)
*F01N 3/10* (2006.01)
*F01N 3/035* (2006.01)
*F01N 13/00* (2010.01)
*F01N 3/20* (2006.01)

(56) References Cited

U.S. PATENT DOCUMENTS

| | | | |
|---|---|---|---|
| 8,091,416 B2 * | 1/2012 | Wang et al. | 73/114.75 |
| 8,201,444 B2 * | 6/2012 | Wang et al. | 73/114.75 |
| 8,245,567 B2 * | 8/2012 | Wang et al. | 73/114.75 |
| 8,726,723 B2 * | 5/2014 | Clerc et al. | 73/114.75 |
| 2007/0044456 A1 * | 3/2007 | Upadhyay et al. | 60/295 |

FOREIGN PATENT DOCUMENTS

| | | | |
|---|---|---|---|
| JP | 2005351153 A | * | 12/2005 |
| JP | 2006-291742 | | 10/2006 |
| JP | 2006291742 A | * | 10/2006 |
| JP | 2008-75610 | | 4/2008 |
| JP | 2009-85079 | | 4/2009 |
| JP | 2010-196496 | | 9/2010 |

OTHER PUBLICATIONS

International Search Report of PCT/JP2011/078284 mailed Feb. 21, 2012.
Patent Abstracts of Japan, Publication No. 2005-201143, Published Jul. 28, 2005.
Patent Abstracts of Japan, Publication No. 2005-351153, Published Dec. 22, 2005.
Patent Abstracts of Japan, Publication No. 2006-291742, Published Oct. 26, 2006.
Patent Abstracts of Japan, Publication No. 2008-075610, Published Apr. 3, 2008.
Patent Abstracts of Japan, Publication No. 2009-085079, Published Apr. 23, 2009.
Patent Abstracts of Japan, Publication No. 2010-196496, Published Sep. 9, 2010.

* cited by examiner

| λ-DIAGNOSIS A | λ-DIAGNOSIS B | CATALYST TEMPERATURE DIAGNOSIS | CAUSE |
|---|---|---|---|
| NG | | | ENGINE-SIDE FAILURE |
| OK | NG | NG | EXHAUST-PIPE FUEL INJECTOR FAILURE |
| OK | OK | NG(#2) | OXIDIZING CATALYST DEVICE FAILURE |
| OK | OK | NG(#3) | OXIDIZING CATALYST DEVICE FAILURE AND NOx PURIFICATION DEVICE FAILURE |
| OK | OK | OK(#1) | NOx PURIFICATION DEVICE FAILURE |

APPARATUS FOR DIAGNOSING CAUSES OF $NO_x$ CONVERSION EFFICIENCY DEGRADATION

CROSS-REFERENCE TO RELATED APPLICATIONS

This application claims the foreign priority benefit of Japanese Patent Application No. 2010-280889 filed Dec. 16, 2010, the contents of which are incorporated herein by reference, which serves as priority for PCT Application No. JP2011/078284 filed Dec. 7, 2011.

TECHNICAL FIELD

The present invention relates to an apparatus for diagnosing causes of $NO_x$ conversion efficiency degradation capable of an on-board diagnostics for specifying a cause of $NO_x$ conversion efficiency degradation.

BACKGROUND ART

In a vehicle having a De-$NO_x$ catalytic post-processing device (for reducing nitrogen oxides) (hereinafter, referred to as a $NO_x$ purification device) such as a hydrocarbon selective catalytic reduction (HC-SCR) device or a lean $NO_x$ trap (LNT) device in an exhaust gas flow path of an engine, a $NO_x$ sensor may be installed in both upstream and downstream sides of the $NO_x$ purification device, and a $NO_x$ conversion efficiency can be computed based on a $NO_x$ concentration ratio detected by such a $NO_x$ sensor.

It is desirable to obtain a temporal change of the $NO_x$ conversion efficiency and perform on-board diagnostics (OBD) for determining that the $NO_x$ purification device has failed when the $NO_x$ conversion efficiency is degraded over a threshold value.

PRIOR ART DOCUMENTS

Patent Document 1: Japanese Patent Application Laid-Open No. 2008-75610
Patent Document 2: Japanese Patent Application Laid-Open No. 2010-196496

However, various members are installed along the exhaust gas flow path from the engine to the downstream of the $NO_x$ purification device. Therefore, the $NO_x$ conversion efficiency may also be degraded when any of such members fail. For example, the $NO_x$ conversion efficiency is also degraded when any one of various members around the engine fails, or when a reducing agent applying device (exhaust-pipe fuel injector) has failed. Therefore, it is difficult to immediately confirm that the $NO_x$ purification device is failed even when the $NO_x$ conversion efficiency is degraded. It is desirable to classify causes of $NO_x$ conversion efficiency degradation regarding whether or not any one of various members around the engine has failed, whether or not the reducing agent applying device has failed, or whether or not the $NO_x$ purification device has failed.

SUMMARY OF THE INVENTION

An object of the present invention is to solve the above problems and to provide an apparatus for diagnosing causes of $NO_x$ conversion efficiency degradation capable of an on-board diagnostics for specifying a cause of $NO_x$ conversion efficiency degradation.

In order to achieve the above object, the present invention provides an apparatus for diagnosing causes of $NO_x$ conversion efficiency degradation applied to an engine system having an exhaust pipe fuel injection, an oxidizing catalyst device, and a $NO_x$ purification device, including: a diagnosis exhaust-pipe fuel injection control unit that performs control such that exhaust-pipe fuel injection is performed for diagnosis purposes when a $NO_x$ conversion efficiency is degraded; a $NO_x$ purification device failure specifying unit that specifies a cause of $NO_x$ conversion efficiency degradation as a $NO_x$ purification device failure if a difference between an actual heat generation amount and a theoretical heat generation amount in the oxidizing catalyst device at the time of the exhaust-pipe fuel injection is within a threshold value; and an oxidizing catalyst device failure specifying unit that specifies a cause of $NO_x$ conversion efficiency degradation as an oxidizing catalyst device failure if a difference between an actual heat generation amount and a theoretical heat generation amount in the oxidizing catalyst device at the time of the exhaust-pipe fuel injection exceeds a threshold value.

The present invention has an excellent effect as follows.
(1) It is possible to perform an on-board diagnostics for specifying a cause of $NO_x$ conversion efficiency degradation.

BRIEF DESCRIPTION OF THE DRAWINGS

It is possible to perform on-board diagnostics for specifying a cause of $NO_x$ conversion efficiency degradation.

DETAILED DESCRIPTION

Hereinafter, embodiments of the present invention will be described in detail with reference to the accompanying drawings.

Figure 1:
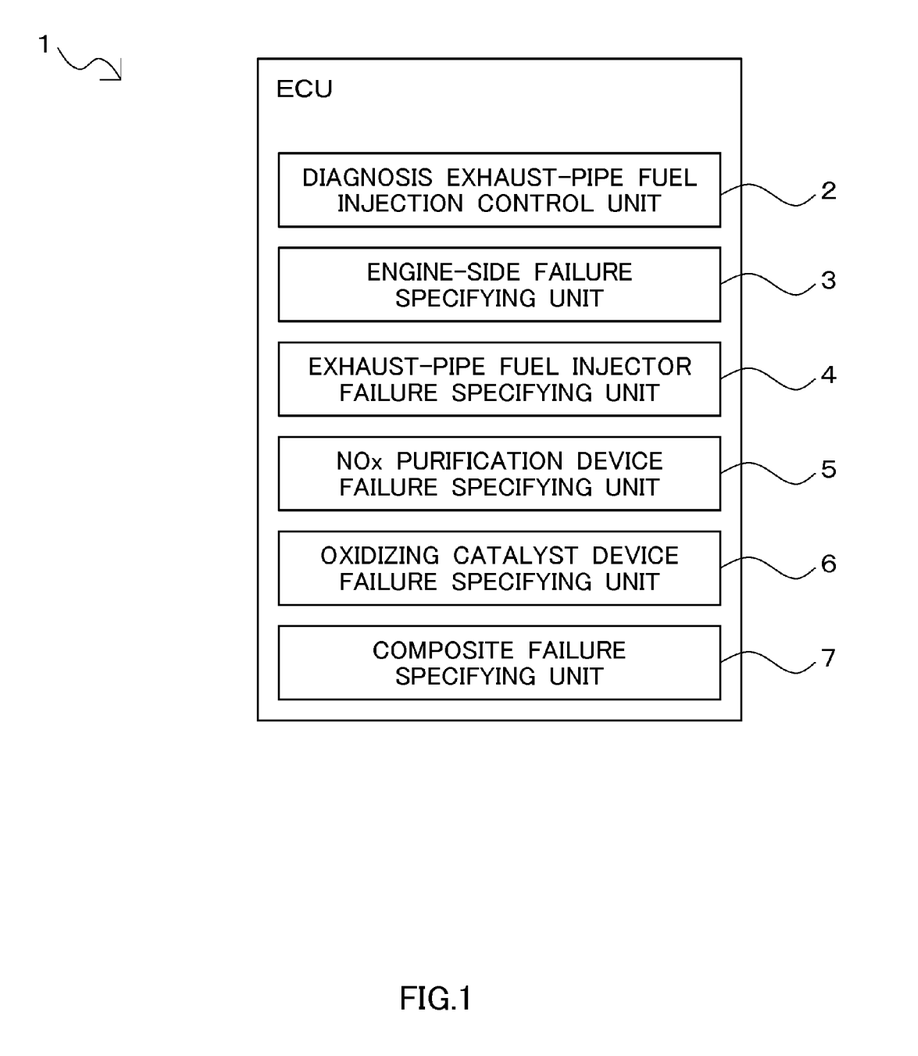
FIG. 1 is a schematic diagram illustrating an apparatus for diagnosing causes of $NO_x$ conversion efficiency degradation according to an embodiment of the present invention.

As illustrated in FIG. 1, an apparatus for diagnosing causes of $NO_x$ conversion efficiency degradation 1 according to the present invention includes: a diagnosis exhaust-pipe fuel injection control unit 2 that performs control such that exhaust-pipe fuel injection for diagnosis purposes is performed when $NO_x$ conversion efficiency is degraded; an engine-side failure specifying unit 3 that specifies a cause of $NO_x$ conversion efficiency degradation as an engine-side failure if a difference between a theoretical exhaust gas air-fuel ratio and an actual exhaust gas air-fuel ratio obtained without performing exhaust-pipe fuel injection exceeds a threshold value; an exhaust-pipe fuel injector failure specifying unit 4 that specifies a cause of $NO_x$ conversion efficiency degradation as an exhaust-pipe fuel injector failure if a difference between the theoretical exhaust gas air-fuel ratio and the actual exhaust gas air-fuel ratio at the time of exhaust-pipe fuel injection exceeds a threshold value; a $NO_x$ purification device failure specifying unit 5 that specifies a cause of $NO_x$ conversion efficiency degradation as a $NO_x$ purification device failure if a difference between the theoretical heat generation amount and the actual heat generation amount in an oxidizing catalyst device at the time of exhaust-pipe fuel injection is within a threshold value; an oxidizing catalyst device failure specifying unit 6 that specifies a cause of $NO_X$ conversion efficiency degradation as an oxidizing catalyst device failure if a difference between the theoretical heat generation amount and the actual heat generation amount in an oxidizing catalyst device at the time of exhaust-pipe fuel injection exceeds a threshold value; and a composite failure specifying unit 7 that specifies a cause of $NO_X$ conversion efficiency degradation as an oxidizing catalyst device failure and a $NO_X$ purification device failure if a difference between the theoretical heat generation amount and the actual heat generation amount in an oxidizing catalyst device at the time of exhaust-pipe fuel injection exceeds a threshold value, and a difference between the theoretical heat generation amount and the actual heat generation amount in the $NO_X$ purification device exceeds a threshold value.

The diagnosis exhaust-pipe fuel injection control unit 2, the engine-side failure specifying unit 3, the exhaust-pipe fuel injector failure specifying unit 4, the $NO_X$ purification device failure specifying unit 5, the oxidizing catalyst device failure specifying unit 6, and the composite failure specifying unit 7 of the apparatus for diagnosing causes of $NO_X$ conversion efficiency degradation 1 are implemented by software executed by an electronic control unit (ECU). It is assumed that the ECU recognizes information on overall engine parameters (such as a sensor detection value, a computation value, and a control value) necessary in control of the engine system.

Figure 2:
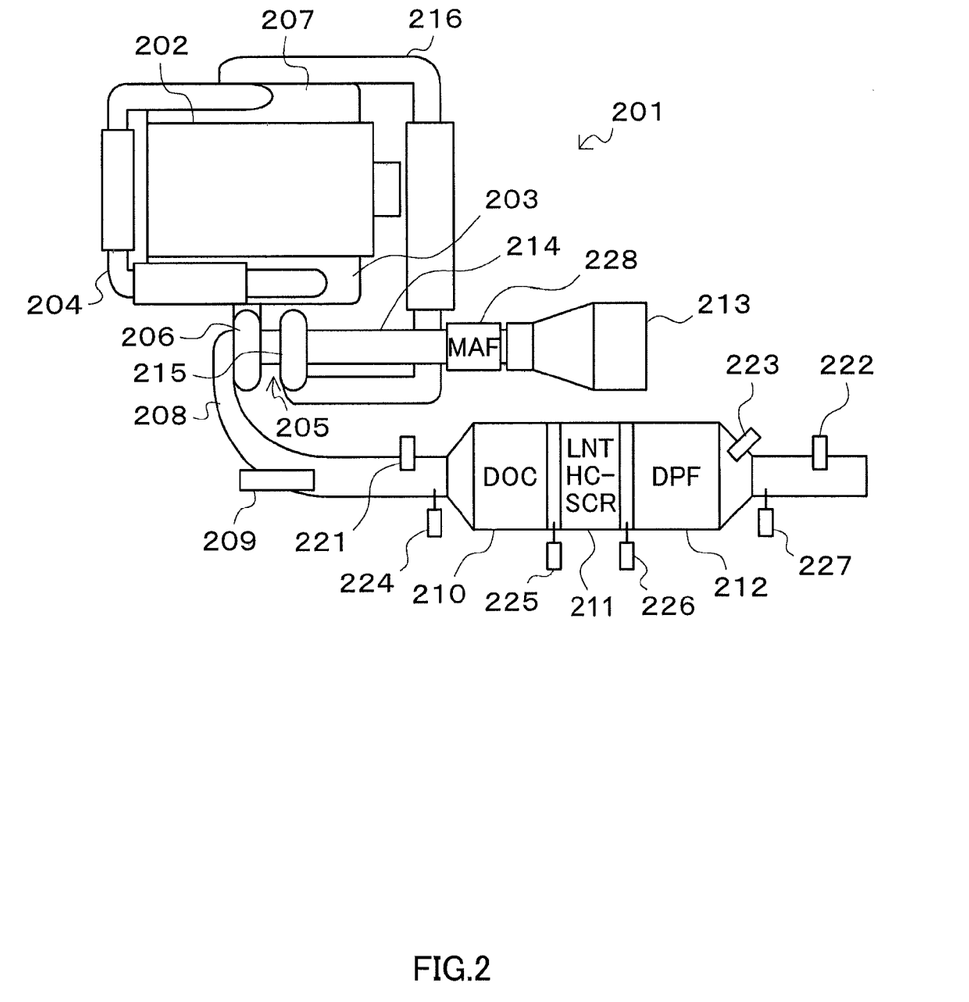
FIG. 2 is a schematic diagram illustrating an engine system where the apparatus for diagnosing causes of $NO_x$ conversion efficiency degradation of FIG. 1 is applied.

As illustrated in FIG. 2, in the engine system 201 where the apparatus for diagnosing causes of $NO_X$ conversion efficiency degradation 1 according to the present invention is applied, an exhaust manifold 203 of the engine 202 is connected to an exhaust gas recirculation (EGR) pipe 204 of an EGR unit and an inlet port of an exhaust turbine 206 of the turbo charger 205. A downstream end of the EGR pipe 204 is connected to an intake manifold 207. An exhaust pipe 208 is connected to an outlet port of the exhaust turbine 206.

From the upstream of the exhaust pipe 208, an exhaust-pipe fuel injector 209 that injects fuel into the exhaust pipe 208, a diesel oxidation catalyst (DOC) device 210 that promotes oxidation of fuel or intermediate products, a $NO_X$ purification device 211 such as a HC-SCR device or an LNT device, a diesel particulate filter (DPF) 212 or a catalyzed soot filter (CSF) that collects particulate matter (PM) are sequentially installed. Since all of the DOC 210, the $NO_X$ purification device 211, and the DPF 212 use a catalyst, the DOC 210, the $NO_X$ purification device 211, and the DPF 212 may be often referred to as simply a catalyst hereinafter.

The exhaust-pipe fuel injector 209 is provided to inject diesel as fuel into the exhaust pipe 208 in a case where particulate matter collected in the DPF 212 is burned and removed (DPF regeneration or PM regeneration). The temperature of the exhaust gas can increase up to a DPF regeneration temperature by oxidizing the injected fuel using a catalyst in the DOC 210, the $NO_X$ purification device 211, the DPF 212, and the like. In addition, exhaust-pipe fuel injection may be performed in order to add a hydrocarbon as a reducing agent to the HC-SCR device and the LNT device. According to the present invention, exhaust-pipe fuel injection is performed for diagnosing a cause of $NO_X$ conversion efficiency degradation.

The intake pipe 214 is connected to an air filter 213 where the atmospheric air is received, and the downstream end of the intake pipe 214 is connected to an inlet port of an intake compressor 215 of the turbo charger 205. A high-pressure intake pipe 216 is connected to an outlet port of the intake compressor 215, and a downstream end of the high-pressure intake pipe 216 is connected to the intake manifold 207.

In the upstream side of the DOC 210 of the exhaust pipe 208, a first $NO_X$ sensor 221 that detects a $NO_X$ concentration in the engine outlet is installed. In the downstream side of the DPF 212, a second $NO_X$ sensor 222 that detects a post-catalyst $NO_X$ concentration is installed. In the downstream side of the DPF 212, an exhaust gas λ-sensor 223 that detects an exhaust gas air-fuel ratio (actual exhaust gas air-fuel ratio) is installed. In the exhaust pipe 208, a first temperature sensor 224 that detects a temperature of the exhaust gas flowing to the DOC 210 (DOC inlet temperature), a second temperature sensor 225 that detects a DOC outlet temperature ($NO_X$ purification device inlet temperature) between the DOC 210 and the $NO_X$ purification device 211, a third temperature sensor 226 that detects a $NO_X$ purification device outlet temperature (DPF inlet temperature) between the $NO_X$ purification device 211 and the DPF 212, and a fourth temperature sensor 227 that detects a DPF outlet temperature in the downstream side of the DPF 212 are installed. In the intake pipe 214, a mass airflow sensor (MAF sensor) 228 that detects an intake air amount is installed.

It is assumed that whether or not each of the first $NO_X$ sensor 221, the second $NO_X$ sensor 222, the exhaust gas λ-sensor 223, and the first to fourth temperature sensors 224 to 227 is normally operated is checked through an on-board diagnostics performed by sensors separately from an on-board diagnostics performed by the apparatus for diagnosing causes of $NO_X$ conversion efficiency degradation 1.

Figure 3:
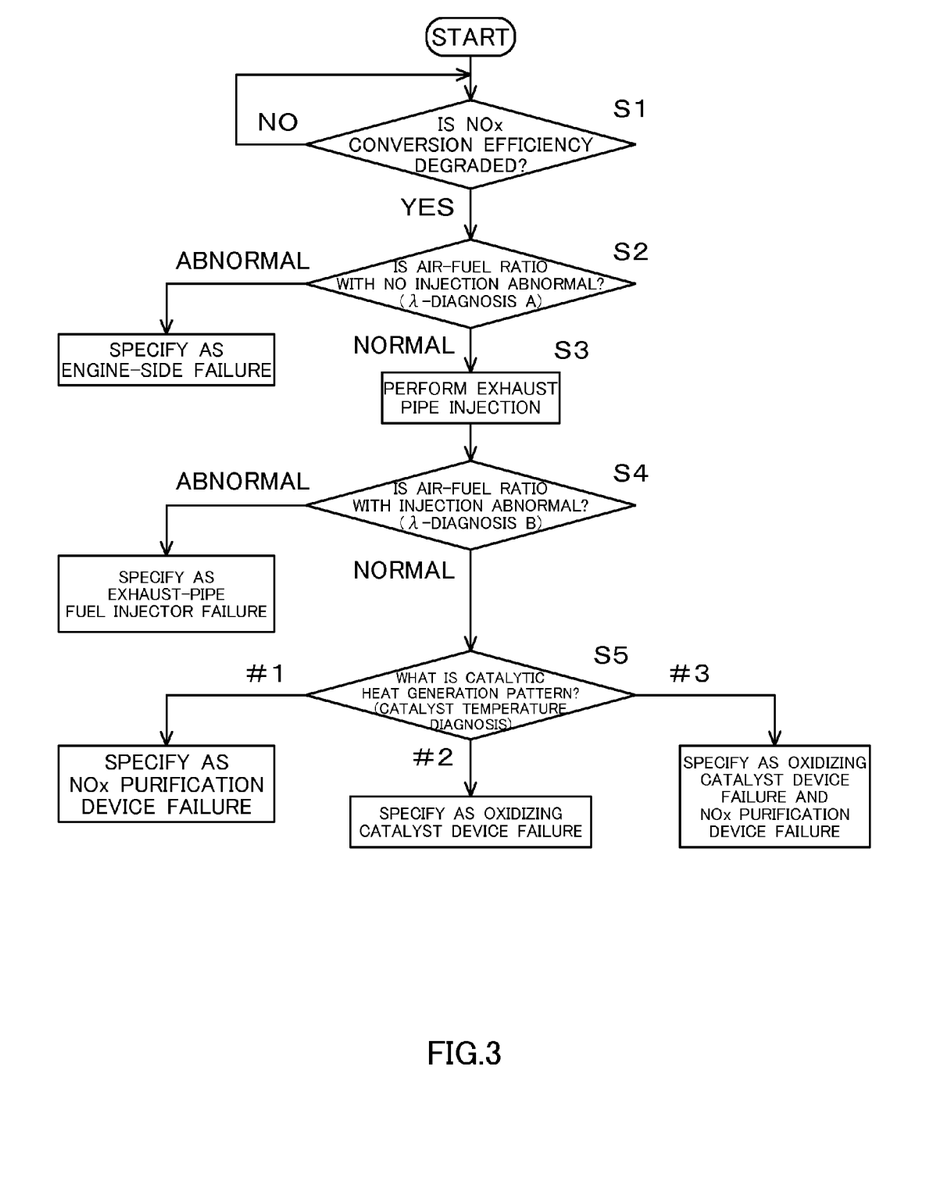
FIG. 3 is a flowchart illustrating a control sequence executed by the apparatus for diagnosing causes of $NO_x$ conversion efficiency degradation of FIG. 1.

As illustrated in FIG. 3, a control sequence executed by the apparatus for diagnosing causes of $NO_X$ conversion efficiency degradation 1 includes step S1 for determining $NO_X$ conversion efficiency degradation, in which it is determined whether or not $NO_X$ conversion efficiency is degraded, step S2 for specifying a cause of failure without performing exhaust-pipe fuel injection (λ-diagnosis A), in which it is determined whether or not the air-fuel ratio with no injection is abnormal, step S3 for performing exhaust-pipe fuel injection, step S4 for specifying a cause of failure by performing exhaust-pipe fuel injection (λ-diagnosis B), in which it is determined whether or not the air-fuel ratio with injection is abnormal, and step S5 for specifying a cause of failure based on a catalytic heat generation pattern (catalytic temperature diagnosis).

Hereinafter, operations in each step will be described in detail.

The apparatus for diagnosing causes of $NO_X$ conversion efficiency degradation 1 determines whether or not $NO_X$ conversion efficiency is degraded when a predetermined determination condition is satisfied in step S1 for determining $NO_X$ conversion efficiency degradation. The determination condition relates to whether or not a temperature of the exhaust gas and a vehicle travel are stabilized. If a vehicle travel is not stable, the engine has a transient state, and $NO_X$ concentration detection in the exhaust gas becomes unstable. Therefore, determination on $NO_X$ conversion efficiency degradation is reserved.

The $NO_X$ conversion efficiency is obtained from a post-catalyst $NO_X$ concentration and a pre-catalyst $NO_X$ concentration. However, according to the present invention, an engine outlet $NO_X$ concentration is used as the pre-catalyst $NO_X$ concentration. That is, the $NO_X$ conversion efficiency is computed based on the following equation from an engine outlet $NO_X$ concentration as a detection value of the first $NO_X$ sensor 221 and a post-catalyst $NO_X$ concentration as a detection value of the second $NO_X$ sensor 222.

NO$_X$ conversion efficiency=(1−post-catalyst NO$_X$ concentration/engine outlet NO$_X$ concentration)×100 (%)

The engine outlet NO$_X$ concentration may be estimated from a theoretical formula or map known in the art using engine parameters without using the first NO$_X$ sensor 221.

The engine outlet NO$_X$ concentration and the post-catalyst NO$_X$ concentration are detected at a predetermined sampling interval at all times, so that the NO$_X$ conversion efficiency can be computed in a real-time manner.

The apparatus for diagnosing causes of NO$_X$ conversion efficiency degradation 1 determines that the NO$_X$ conversion efficiency is degraded in a case where a state that the NO$_X$ conversion efficiency is equal to or lower than a threshold value is continuously maintained for a predetermined time. As a result of this determination, a diagnosis for a cause of NO$_X$ conversion efficiency degradation according to the present invention is substantially initiated.

In step S2 for specifying a cause of failure (λ-diagnosis A) without performing exhaust-pipe fuel injection, it is determined whether or not the air-fuel ratio with no injection is abnormal. That is, the engine-side failure specifying unit 3 computes a theoretical exhaust gas air-fuel ratio in an installation position of the exhaust gas λ-sensor 223 based on a theoretical formula known in the art using the intake air amount and the fuel injection amount and compares the result with the actual exhaust gas air-fuel ratio detected by the exhaust gas λ-sensor 223. If a difference between the actual exhaust gas air-fuel ratio and the theoretical exhaust gas air-fuel ratio exceeds a predetermined threshold value, it is determined that abnormality occurs. In this case, since the theoretical exhaust gas air-fuel ratio is not appropriately computed, a cause of NO$_X$ conversion efficiency degradation is specified as an engine-side failure.

The engine failure means that any one of various members located in the upstream side of the exhaust pipe 208 has failed. For example, if the MAF sensor 228 has failed, the intake air amount becomes inaccurate. Therefore, a computation of the theoretical exhaust gas air-fuel ratio becomes inaccurate. For example, if a clogging occurs in the fuel injector in the engine 202, a difference of the fuel injection amount increases, so that a computation of the theoretical exhaust gas air-fuel ratio becomes inaccurate. In this manner, in a case where a cause of NO$_X$ conversion efficiency degradation is specified as the engine-side failure, a diagnosis for further specifying the failed portion may be performed. For this purpose, abnormality determination information (such as an abnormal sensor output voltage) known in the art regarding various members such as the EGR valve, the intake throttle, the turbo charger, and the MAF sensor 228 may be employed.

If the difference is equal to or lower than a threshold value in determination of step S2, it can be determined that the air-fuel ratio with no injection is normal, that is, there is no abnormality in the engine side. Therefore, the process advances to the next step.

In step S3 in which the exhaust-pipe fuel injection is performed, the diagnosis exhaust-pipe fuel injection control unit 2 performs exhaust-pipe fuel injection. The exhaust-pipe fuel injection is performed with the same injection amount as that of the DPF regeneration. In a vehicle having a regeneration switch for manual DPF regeneration, the exhaust-pipe fuel injection may be performed manually by an operator by urging an operator to operate the switch during the control sequence.

In step S4 for specifying a cause of failure by performing exhaust-pipe fuel injection (λ-diagnosis B), it is determined whether or not the air-fuel ratio with injection is abnormal.

That is, the exhaust-pipe fuel injector failure specifying unit 4 computes the theoretical exhaust gas air-fuel ratio in an installation position of the exhaust gas λ-sensor 223 based on a theoretical formula known in the art using the exhaust-pipe fuel injection amount and the exhaust gas weight discharged by the engine 202 obtained from the intake air amount and the fuel injection amount and compares the result with the actual exhaust gas air-fuel ratio detected by the exhaust gas λ-sensor 223. If a difference between the actual exhaust gas air-fuel ratio and the theoretical exhaust gas air-fuel ratio exceeds a predetermined threshold value, it is determined that abnormality occurs. In this case, since it is recognized that the theoretical exhaust gas air-fuel ratio can be appropriately computed, a cause of NO$_X$ conversion efficiency degradation is specified as an exhaust-pipe fuel injector failure.

If the difference is equal to or lower than a threshold value in determination of step S4, it can be determined that the air-fuel ratio with injection is normal, and the exhaust-pipe fuel injector 209 is thus normally operated.

In step S5 for specifying a cause of failure based on a catalytic heat generation pattern (catalyst temperature diagnosis), the catalytic heat generation pattern is determined. The catalytic heat generation pattern represents a heat distribution based on an actual measurement in a path along the exhaust pipe 208 including the DOC 210, the NO$_X$ purification device 211, and DPF 212.

Figure 4:
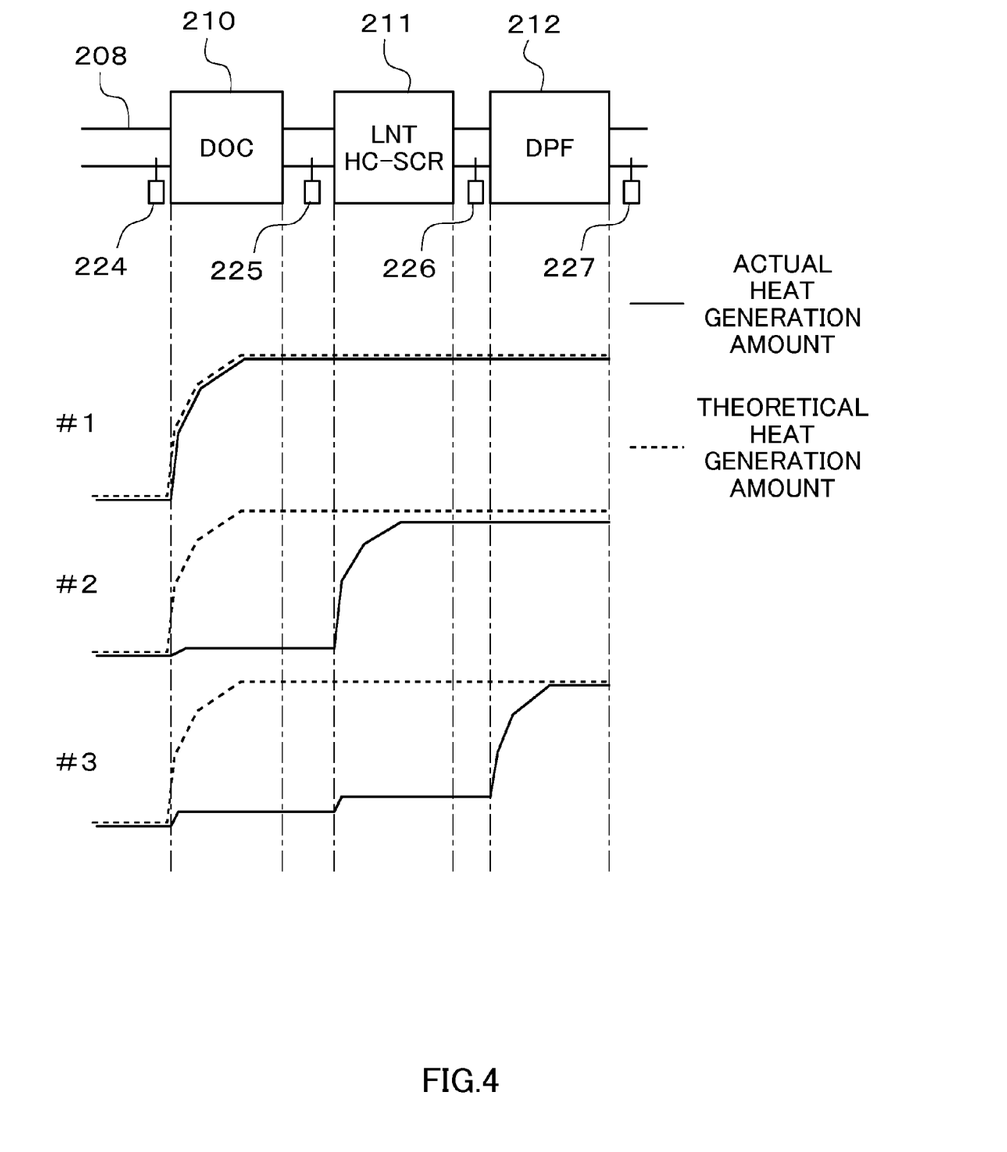
FIG. 4 is a heat distribution diagram along an exhaust pipe.

As illustrated in FIG. 4, a temperature difference between the inlet and outlet ports for each catalyst is obtained based on exhaust gas temperatures in each of the catalyst inlet and outlet ports detected by the first to fourth temperature sensors 224 to 227, and an integral heat generation amount in each catalyst may be computed based on the temperature difference. This is set to an actual heat generation amount. Meanwhile, the integral heat generation amount to be generated for each catalyst may be computed by applying a heat generation coefficient, a heat generation amount, and the like for each catalyst to an empirical formula obtained in advance through measurement. This is set to a theoretical heat generation amount.

For example, the actual heat generation amount and the theoretical heat generation amount are obtained as described below. An exhaust gas flow amount is computed based on the intake air amount, the fuel injection amount, and the temperature of each catalyst inlet port at the time of DPF regeneration. An instantaneous catalytic heat generation amount is computed based on a specific heat of the exhaust gas, the exhaust gas flow amount, and a temperature difference between the inlet and outlet ports of the DOC 210. An integral heat generation amount is computed by integrating this catalytic heat generation amount. Specifically, the instantaneous catalytic heat generation amount is computed based on the following equation.

Instantaneous catalytic heat generation amount=(Temperature difference between inlet and outlet ports of DOC)×(Exhaust gas flow amount)×(Specific heat of exhaust gas)

Meanwhile, the instantaneous theoretical heat generation amount is computed based on a fuel consumption amount and a low-level heat generation amount (for example, 38.2 MJ/L) of diesel as fuel. This is value is also integrated.

Instantaneous theoretical heat generation amount= (Low-level heat generation amount of diesel)× (Fuel consumption amount)

The theoretical heat generation amount remarkably rises in the vicinity of the inlet port in the DOC 210 as indicated by the dotted line and then becomes constant. The catalytic heat generation pattern #1 indicated by the solid line mostly matches a distribution obtained based on the theoretical heat generation amount. On the contrary, the catalytic heat generation pattern #2 rises little in the DOC 210, whereas the catalytic heat generation pattern #2 remarkably rises in the vicinity of the inlet port in the $NO_X$ purification device 211 and then becomes constant. The catalytic heat generation pattern #3 also rises little in both the DOC 210 and the $NO_X$ purification device 211, whereas the catalytic heat generation pattern #3 remarkably rises in the vicinity of the inlet port of the DPF 212.

Considering the catalytic heat generation pattern #1, the actual heat generation amount exactly matches the theoretical heat generation amount in the DOC 210, so that it can be determined that the DOC 210 is normally operated. Since the exhaust gas temperature increases in the DOC 210, it is difficult to determine whether or not the $NO_X$ purification device 211 is normally operated just by the catalytic heat generation pattern #1.

Considering the catalytic heat generation pattern #2, the actual heat generation amount is significantly different from the theoretical heat generation amount in the DOC 210. Meanwhile, the actual heat generation amount is large in the $NO_X$ purification device 211, and a distribution of the heat generation amount after the $NO_X$ purification device 211 is the same. As a result, it can be determined that abnormality occurs in the DOC 210. In addition, it can be determined that a heating functionality of the $NO_X$ purification device 211 is normally operated.

Considering the catalytic heat generation pattern #3, the actual heat generation amount is significantly different from the theoretical heat generation amount in the DOC 210 and the $NO_X$ purification device 211. Therefore, it can be determined that abnormality occurs in both the DOC 210 and the $NO_X$ purification device 211.

It is possible to specify a failed portion by combining consideration for the catalytic heat generation patterns described above and an event that the $NO_X$ conversion efficiency degradation is degraded.

In a case where the catalytic heat generation pattern #1 is obtained based on the exhaust gas temperature detected by the first to fourth temperature sensors 224 to 227, a difference between the actual heat generation amount and the theoretical heat generation amount in the DOC 210 is within a threshold value. Therefore, it can be determined that the DOC 210 is normally operated. Since it is already determined that there is no abnormality in the engine side, and the exhaust-pipe fuel injector 209 is also normally operated, only the $NO_X$ purification device 211 remains as a cause of $NO_X$ conversion efficiency degradation. Therefore, the $NO_X$ purification device failure specifying unit 5 specifies a cause of $NO_X$ conversion efficiency degradation as the $NO_X$ purification device failure. For example, the threshold value is set to (theoretical heat generation amount)×0.8 as a reference.

In a case where the catalytic heat generation pattern #2 is obtained, it is confirmed that abnormality occurs in the DOC 210. Meanwhile, based on a fact that a difference between the actual heat generation amount and the theoretical heat generation amount in the $NO_X$ purification device 211 is within a threshold value ((theoretical heat generation amount)×0.8 as a reference), and the heating functionality of the $NO_X$ purification device 211 is normally operated, it is difficult to uniquely determine that a cause of $NO_X$ conversion efficiency degradation is an oxidizing catalyst device failure. This is because, in the $NO_X$ purification device 211, it is probable that the $NO_X$ purification functionality is abnormally operated although a heating functionality is normally operated. However, it was acknowledged by the inventors that abnormality in the heating functionality of the catalyst and abnormality in the $NO_X$ purification functionality are simultaneously generated. Therefore, the oxidizing catalyst device failure is highly probable. Therefore, the oxidizing catalyst device failure specifying unit 6 specifies a cause of $NO_X$ conversion efficiency degradation as an oxidizing catalyst device failure.

In a case where the catalytic heat generation pattern #3 is obtained, it is confirmed that abnormality occurs in the DOC 210 and the $NO_X$ purification device 211. Therefore, the composite failure specifying unit 7 specifies a cause of $NO_X$ conversion efficiency degradation as an oxidizing catalyst device failure and a $NO_X$ purification device failure.

Figure 5:
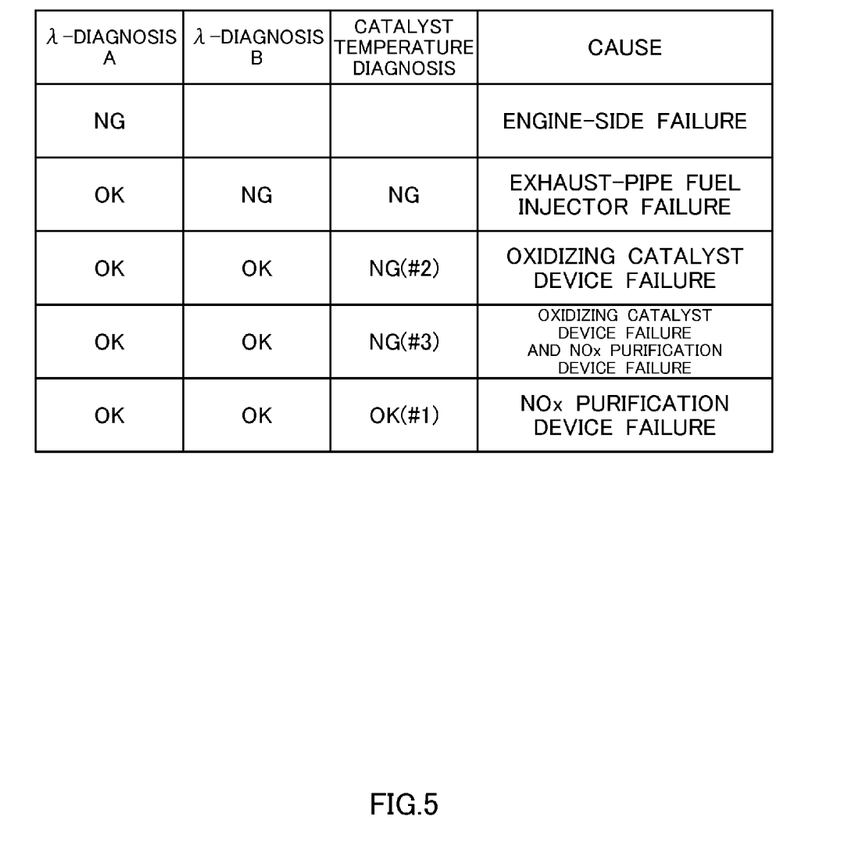
FIG. 5 is a diagram illustrating a diagnosis matrix equivalent to the control sequence of FIG. 3.

A diagnosis matrix of FIG. 5 can be defined equivalently to the control sequence of FIG. 3. That is, as illustrated in FIG. 5, determination in a λ-diagnosis A of step S2 is NG (abnormal), a cause of $NO_X$ conversion efficiency degradation is specified as an engine-side failure. If determination in the λ-diagnosis A of step S2 is OK (normal), and determination in the λ-diagnosis B of step S4 is NG, a cause of $NO_X$ conversion efficiency degradation is specified as an exhaust-pipe fuel injector failure. Here, in the sequence of FIG. 3, the catalyst temperature diagnosis of step S5 is not executed. However, if the catalyst temperature diagnosis is executed, for example, a catalytic heat generation pattern having no temperature increase in all catalysts is obtained, and determination in this case becomes NG.

In a case where it is determined OK in both the λ-diagnosis A and the λ-diagnosis B, the process advances as follows. If it is determined OK in the catalyst temperature diagnosis (the actual heat generation amount matches the theoretical heat generation amount, that is, catalytic heat generation pattern #1), a cause of $NO_X$ conversion efficiency degradation is specified as a $NO_X$ purification device failure. If it is determined NG in the catalyst temperature diagnosis due to the catalytic heat generation pattern #2, a cause of $NO_X$ conversion efficiency degradation is specified as an oxidizing catalyst device failure. If it is determined NG in the catalyst temperature diagnosis due to the catalytic heat generation pattern #3, a cause of $NO_X$ conversion efficiency degradation is specified as an oxidizing catalyst device failure and a $NO_X$ purification device failure.

As described above, in the apparatus for diagnosing causes of $NO_X$ conversion efficiency degradation 1 according to the present invention, a catalyst temperature diagnosis of the DOC 210 is performed by performing exhaust-pipe fuel injection for diagnosis purposes when the $NO_X$ conversion efficiency is degraded. As a result, if a normal heat generation amount is obtained in the DOC 210, a cause of $NO_X$ conversion efficiency degradation can be specified as a $NO_X$ purification device failure. Otherwise, if a normal heat generation amount is not obtained in the DOC 210, a cause of $NO_X$ conversion efficiency degradation can be specified as an oxidizing catalyst device failure.

If the λ-diagnosis A and the λ-diagnosis B are performed according to the present embodiment, a cause of $NO_X$ conversion efficiency degradation can be specified as an engine-side failure and an exhaust-pipe fuel injector failure. Therefore, it is possible to more precisely classify causes of failure.

The apparatus for diagnosing causes of $NO_X$ conversion efficiency degradation 1 according to the present invention can be implemented just by changing software of the ECU without adding an additional member to the engine system 201. Therefore, there is no further cost increase.

In the present embodiment, it is assumed that the present invention is applied to an engine system 201 having the exhaust-pipe fuel injector 209, the DOC 210, the $NO_X$ purification device 211, and the DPF 212 sequentially installed from the upstream of the exhaust pipe 208. However, the present invention is also applicable to an engine system having the exhaust-pipe fuel injector 209, the $NO_X$ purification device 211, and the DPF 212 without the DOC 210. Furthermore, the present invention may also be applicable to a case where a cause of failure in the particulate matter (PM) purification is specified as an engine-side failure, an exhaust-pipe fuel injector failure, and a DPF failure in an engine system having the exhaust-pipe fuel injector 209 and the DPF 212 without the DOC 210 and the $NO_X$ purification device 211. Moreover, in an engine system in which a urea-SCR is used in $NO_X$ purification, the present invention may be applicable to specify a cause of failure as elements other than a urea water injector when the $NO_X$ conversion efficiency is degraded.

The invention claimed is:

1. An apparatus for diagnosing causes of $NO_X$ conversion efficiency degradation applied to an engine system having an exhaust pipe fuel injector, an oxidizing catalyst device, and a $NO_X$ purification device, comprising:
    an engine-side failure specifying unit that specifies a cause of a $NO_X$ conversion efficiency degradation as an engine-side failure, if a difference between a theoretical exhaust gas air-fuel ratio and an actual exhaust gas air-fuel ratio exceeds a threshold value, when a $NO_X$ conversion efficiency is degraded;
    a diagnosis exhaust-pipe fuel injection control unit that causes exhaust-pipe fuel injection to be performed by the exhaust pipe fuel injector for diagnosis purposes when a $NO_X$ conversion efficiency is degraded;
    an exhaust-pipe fuel injector failure specifying unit that specifies a cause of $NO_X$ conversion efficiency degradation as an exhaust-pipe fuel injector failure, if a difference between the theoretical exhaust gas air-fuel ratio and the actual exhaust gas air-fuel ratio, when the exhaust-pipe fuel injection is performed, exceeds a threshold value;
    a $NO_X$ purification device failure specifying unit that specifies a cause of $NO_X$ conversion efficiency degradation as a $NO_X$ purification device failure, if a difference between an actual heat generation amount and a theoretical heat generation amount in the oxidizing catalyst device, when the exhaust-pipe fuel injection is performed, is within a threshold value; and
    an oxidizing catalyst device failure specifying unit that specifies a cause of $NO_X$ conversion efficiency degradation as an oxidizing catalyst device failure, if a difference between the actual heat generation amount and ache theoretical heat generation amount in the oxidizing catalyst device, when the exhaust-pipe fuel injection is performed, exceeds a threshold value;
    wherein the specifying a cause of $NO_X$ conversion efficiency degradation by the engine-side failure specifying unit, the specifying a cause of $NO_X$ conversion efficiency degradation by the exhaust-pipe fuel injector failure specifying unit, the specifying a cause of $NO_X$ conversion efficiency degradation by the $NO_X$ purification device failure specifying unit, and the specifying a cause of $NO_X$ conversion efficiency degradation by the oxidizing catalyst device failure specifying unit are performed in order.

2. The apparatus for diagnosing causes of $NO_X$ conversion efficiency degradation according to claim 1, further comprising:
    a composite failure specifying unit that specifies a cause of $NO_X$ conversion efficiency degradation as an oxidizing catalyst device failure and a $NO_X$ purification device failure, if a difference between the actual heat generation amount and the theoretical heat generation amount in the oxidizing catalyst device, when the exhaust-pipe fuel injection is performed, exceeds a threshold value, and a difference between the actual heat generation amount and the theoretical heat generation amount in the $NO_X$ purification device exceeds a threshold value.

* * * * *